(12) United States Patent
Yun

(10) Patent No.: US 8,577,947 B2
(45) Date of Patent: Nov. 5, 2013

(54) METHOD OF FINDING SOLUTION OF EQUATION AND RECORDING MEDIUM STORING PROGRAM FOR IMPLEMENTING THE SAME

(75) Inventor: Beong-in Yun, Chonpuk (KR)

(73) Assignee: Kunsan National University Industry-Academic Cooperation Foundation, Kunsan (KR)

( * ) Notice: Subject to any disclaimer, the term of this patent is extended or adjusted under 35 U.S.C. 154(b) by 854 days.

(21) Appl. No.: 12/718,322

(22) Filed: Mar. 5, 2010

(65) Prior Publication Data

US 2010/0241678 A1 Sep. 23, 2010

(30) Foreign Application Priority Data

Mar. 17, 2009 (KR) .................. 10-2009-0022620

(51) Int. Cl.
*G06F 7/38* (2006.01)

(52) U.S. Cl.
USPC ............................ 708/446; 708/200; 708/207

(58) Field of Classification Search
None
See application file for complete search history.

(56) References Cited

U.S. PATENT DOCUMENTS 4,398,263 A * 8/1983 Ito .................................. 708/444
5,274,580 A * 12/1993 Keryvel et al. ................ 708/653

* cited by examiner

*Primary Examiner* — Michael D Yaary
(74) *Attorney, Agent, or Firm* — Lowe Hauptman & Ham, LLP

(57) ABSTRACT

The present invention relates to a solution-finding method, which finds an approximate solution of an equation having difficulty in obtaining an actual solution and a complicated equation in numerical analysis. The method obtains an approximate solution of an equation having a solution in a predetermined interval. Initial values are calculated based on upper and lower limits of the interval. The initial values are applied to a solution-finding equation, including a sign function and the upper and lower limits, and the solution-finding equation is arranged so that a definite integral formula for the sign function is included in the equation. The definite integral formula in the solution-finding equation is calculated using numerical integration, and results of the definite integral formula are applied to the solution-finding equation, thus obtaining an approximate solution. This performance is iterated until the approximate solution satisfies an allowable error.

14 Claims, 4 Drawing Sheets

$f_2(x)$

METHOD OF FINDING SOLUTION OF EQUATION AND RECORDING MEDIUM STORING PROGRAM FOR IMPLEMENTING THE SAME

CROSS REFERENCE TO RELATED APPLICATION

This application claims the priority of Korean Patent Application No. 10-2009-0022620, filed on Mar. 17, 2009 in the KIPO (Korean Intellectual Property Office), the disclosure of which are incorporated herein in their entirety by reference.

BACKGROUND (a) Technical Field

The present disclosure relates in general to numerical analysis or applied mathematics. More particularly, it relates to a solution-finding method which finds an approximate solution of an equation in commercial software required for calculation in mathematics and engineering, and a numerical analysis code using the solution-finding method.

(b) Background Art

Generally, when the shape of a gas turbine is designed or when the appearance of an airplane or a vehicle is designed, an optimal shape is designed using hydrodynamics. With the development of computers, numerical analysis using hydrodynamics has been mainly conducted using computers, and solutions (or roots) of a large number of equations related to hydrodynamics are generally obtained by finding approximate solutions.

Conventional methods of finding approximate solutions may include, for example, a bisection method, Newton's method, and a secant method. A bisection method is a method using the change of the sign of a function in an interval so as to find a solution present in the interval, and is configured to obtain a solution by always bisecting an interval and finding a section in which the sign of a function changes. Such a bisection method is advantageous because a solution can always be obtained, but is disadvantageous because the speed of convergence is low.

Newton's method is a method of obtaining a solution using a derivative, and is advantageous because the speed of convergence is very high near a solution. However, there is a problem in that when an equation has a slope close to '0', it is difficult to obtain a solution, and in that when an initially estimated value is erroneously obtained, Newton's method does not converge on a solution, thus making it impossible to find a solution.

A secant method is a method obtained by modifying Newton's method into a two-point method so as to solve the problem of calculating a derivative in Newton's method. However, this method is problematic in that the speed of convergence is generally slightly lower than that of Newton's method, two initial values are required, and the probability of failing in convergence according to the behavior of a function cannot be excluded.

As described above, the conventional solution-finding methods are problematic in that the speed of convergence is excessively low and the speed of calculation is low, and in that, when an initially estimated value is erroneously set, it is impossible to find a solution, or, alternatively, the time of calculation required to find a solution increases.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art. Therefore, the present invention provides a method of finding a solution of an equation and recording medium storing a program for implementing the method, which can reliably and accurately find a solution at high convergence speed without a burden of suitably setting an initially estimated value.

In one aspect, the present invention provides a method of finding a solution of an equation, the method obtaining an approximate solution of an equation having a solution in a predetermined interval, comprising a) calculating initial values based on upper and lower limits of the interval; b) applying the initial values to a solution-finding equation which includes a sign function and the upper and lower limits, and arranging the solution-finding equation so that a definite integral formula for the sign function of the equation is included in the solution-finding equation; c) calculating the definite integral formula in the arranged solution-finding equation using numerical integration, and inductively applying results of the calculation of the definite integral formula to the arranged solution-finding equation, thus obtaining an approximate solution; and d) iterating c) until the approximate solution obtained at c) satisfies an allowable error.

In another aspect, the present invention provides a method of finding a solution of an equation, the method obtaining an approximate solution of an equation having a solution in a predetermined interval, comprising a) calculating initial values based on upper and lower limits of the interval; b) applying the initial values to a solution-finding equation which includes a sign function and the upper and lower limits, and arranging the solution-finding equation so that a definite integral formula for the sign function of the equation is included in the solution-finding equation; c) calculating the definite integral formula in the arranged solution-finding equation using numerical integration, and inductively applying results of the calculation of the definite integral formula to the arranged solution-finding equation, thus obtaining an approximate solution; and d) obtaining a resulting approximate solution based on a secant method which uses the approximate solution, calculated by iterating c) a preset number of times, as an initially estimated value.

In still another aspect, the present invention provides a method of finding a solution of an equation, the method obtaining an approximate solution of an equation having a solution in a predetermined interval, comprising a) calculating initial values based on upper and lower limits of the interval; b) applying the initial values to a solution-finding equation which includes a sign function and the upper and lower limits, and arranging the solution-finding equation so that a definite integral formula for the sign function of the equation is included in the solution-finding equation; c) calculating the definite integral formula in the arranged solution-finding equation using numerical integration, and inductively applying results of the calculation of the definite integral formula to the arranged solution-finding equation, thus obtaining an approximate solution; and d) obtaining a resulting approximate solution based on Newton's method which uses the approximate solution, calculated by iterating c) a preset number of times, as an initially estimated value.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
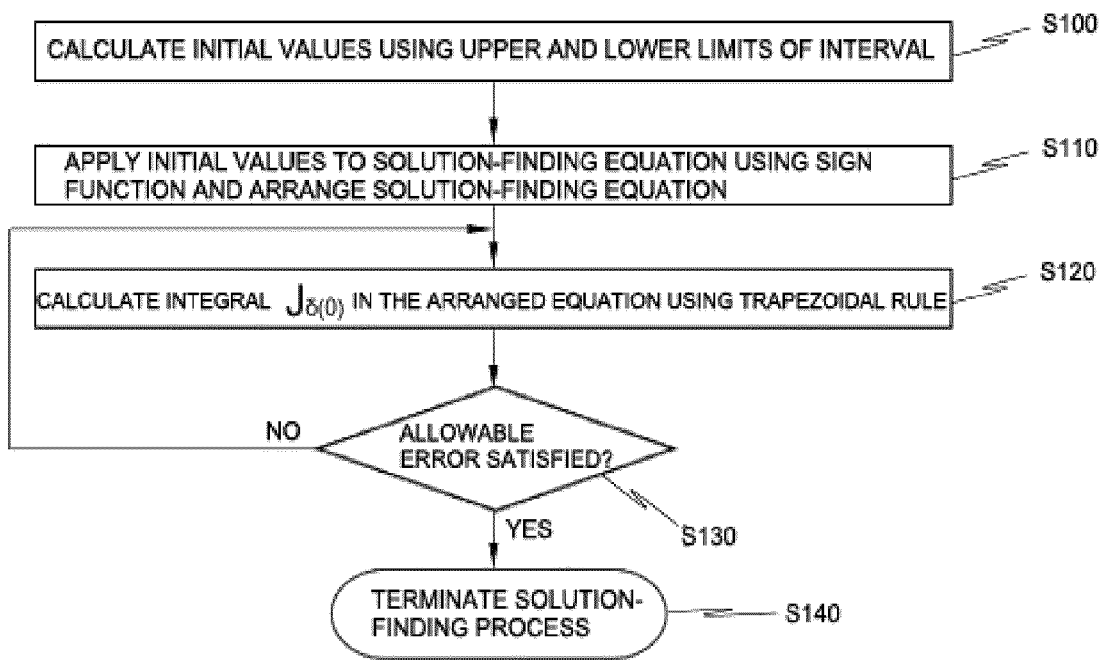
FIG. 1 is a flowchart showing a solution-finding method according to a first embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, a method of finding a solution of an equation and recording medium storing a program for implementing the method according to the present invention will be described in detail with reference to the attached drawings.

FIG. 1 is a flowchart showing a solution-finding method according to a first embodiment of the present invention. The solution-finding method of the present invention is intended to solve problems occurring when the conventional Newton's method or secant method is used, that is, problems in that initial values must be set and in that when initial values are not suitable, the speed of convergence is low, and at worst, the conventional method cannot obtain an approximate solution, but diverges, and problems in that before an equation is iterated to obtain a solution, an initial derivative must be known and in that when a graph is level near a location at which a solution is present, the solution cannot be obtained.

First, the solution-finding method of the present invention calculates initial values using upper and lower limits of an interval [a, b] of a function f(x) when a single solution is present in the interval [a, b]. These initial values are values different from those of Newton's method or a secant method, and are obtained by calculating the upper and lower limits of an interval when the interval is set and a solution is intended to be obtained in the interval at step S100.

The initial values, obtained using the upper and lower limits of the interval, are given by the following Equation (1).

$$p^{(0)}=(a+b)/2,\ \delta^{(0)}=(b-a)/2 \quad (1)$$

The initial values are applied to a solution-finding equation which uses a sign function, and then the solution-finding equation is arranged. The arranged solution-finding equation is a relational expression using the sign function of the function f(x), the solution of which is desired to be obtained.

The solution-finding equation of the present invention is an equation obtained using a sign function, and uses the fact that a value of x which makes f(x), the solution of which is desired to be obtained, to be '0' is unchangeable even in the sign conversion function sgn(f(x)) of f(x). That is, the solution-finding equation is based on a principle in which the sign conversion function sgn(f(x)) maintains the solution of the original function f(x) in a given interval without change and converts the behavior of the function f(x) into a stepped shape having limits of −1 and 1.

Based on the above principle, the integral of the sign function of the function f(x) over the interval [a, b] can be arranged, as represented by the following Equation (2), $$\int_a^b \mathrm{sgn}(f(x))dx = \mathrm{sgn}(f(a))\{(p^* - a) - (b - p^*)\} \quad (2)$$

where p* is an actual solution of the function f(x) in the interval [a, b]. Further, when the above equation is arranged, the following Equation (3) can be derived.

$$p^* = \frac{1}{2}\{a + b + \mathrm{sgn}f(a) \cdot I\} \quad (3)$$

$$I = \int_a^b \mathrm{sgn}f(x)dx$$

In order to obtain I in Equation (3), the initial values are applied to Equation (3), and the solution-finding equation for finding a solution can be arranged, as represented by the following Equation (4) at step S110, $$p^* = p^{(0)} + \frac{\mathrm{sgn}f(a)}{2} J_{\delta^{(0)}} \quad (4)$$

$$J_{\delta^{(0)}} = \int_{p^{(0)}-\delta^{(0)}}^{p^{(0)}+\delta^{(0)}} \mathrm{sgn}f(x)dx$$

where $p^{(0)}$ and $\delta^{(0)}$ are defined in Equation (1), and $p^{(0)}=(a+b)/2$, $\delta^{(0)}=(b-a)/2$, and $J_{\delta^{(0)}}=1$ are satisfied, and thus Equation (4) can be derived from Equation (3).

In order to obtain $J_{\delta^{(0)}}$ in Equation (4), $J_{\delta^{(0)}}$ is applied to numerical integration which uses a trapezoidal rule, and then a relational expression for an iterative method given in the following Equation (5) is calculated at step S120.

$$p^{(k)} = p^{(k-1)} + \mathrm{sgn}f(a)\frac{\delta^{(k-1)}}{N}\sum_{j=1}^{N-1}\mathrm{sgn}f\left(x_j^{(k-1)}\right),\ k = 1, 2, \Lambda \quad (5)$$

$$\delta^{(k-1)} = \frac{b-a}{2N^{k-1}}$$

$$x_j^{(k-1)} = p^{(k-1)} + (2j-N)\cdot\frac{\delta^{(k-1)}}{N}$$

When Equation (5) is iteratively calculated, a value close to an actual solution can be obtained in the interval [a, b] of f(x). However, in typical numerical analysis, a certain error may occur. Accordingly, the error between the actual solution and an approximate solution that can be obtained by Equation (5) is calculated, and whether the error falls within an allowable range is determined at step S130.

When a value falling within the allowable error range is derived, the value calculated up to that time is output as an approximate solution, and the solution-finding process is terminated.

Thanks to the above solution-finding method, the present invention is advantageous in that it does not require an initially estimated value and an initial differential value and it has a convergence speed much higher than that of the conventional solution-finding method. In a commercial numerical analysis code for fluid analysis such as a gas turbine, an equation not only is very complicated, but also has a high degree of an equation, and thus a large number of loads are carried for the calculation of an approximate solution using the conventional method. In contrast, in the solution-finding method of the present invention is advantageous in that the speed of convergence is high and a calculation process is simplified while a solution is accurately obtained, thus enabling complicated numerical analysis to be performed at computers having low specifications.

Figure 2:
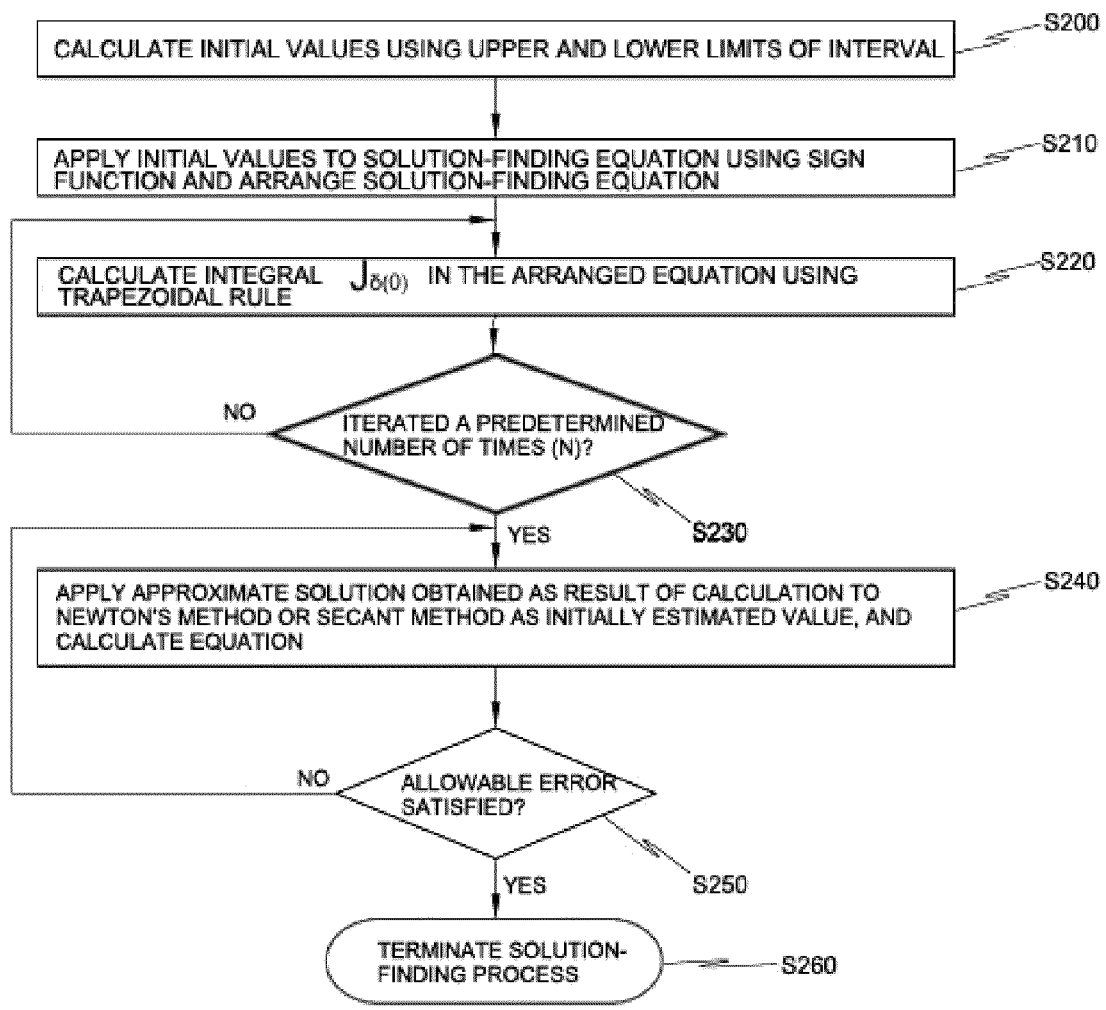
FIG. 2 is a flowchart showing a solution-finding method according to second and third embodiments of the present invention.

FIG. 2 is a flowchart showing a solution-finding method according to second and third embodiments of the present invention. As described above, a conventional method requires a suitable initially estimated value and an initial differential value to find a solution. Therefore, in the second and third embodiments of the present invention, a value which is calculated by iterating the process of the first embodiment of the present invention a predetermined number of times is substituted for the initially estimated value of Newton's method or the secant method, and thus an approximate solution falling within the allowable error range is obtained by the conventional Newton's method or secant method.

By the above process, a commercial numerical analysis code for obtaining an approximate solution is simply modified using the conventional Newton's method or secant method, thus realizing the effect of finding an approximate solution more efficiently. Further, the present invention can obtain a much higher convergence speed while using the advantage of a conventional solution-finding method without change, and can solve the problem of divergence occurring when an initially estimated value is erroneously set in Newton's method.

Figure 3:
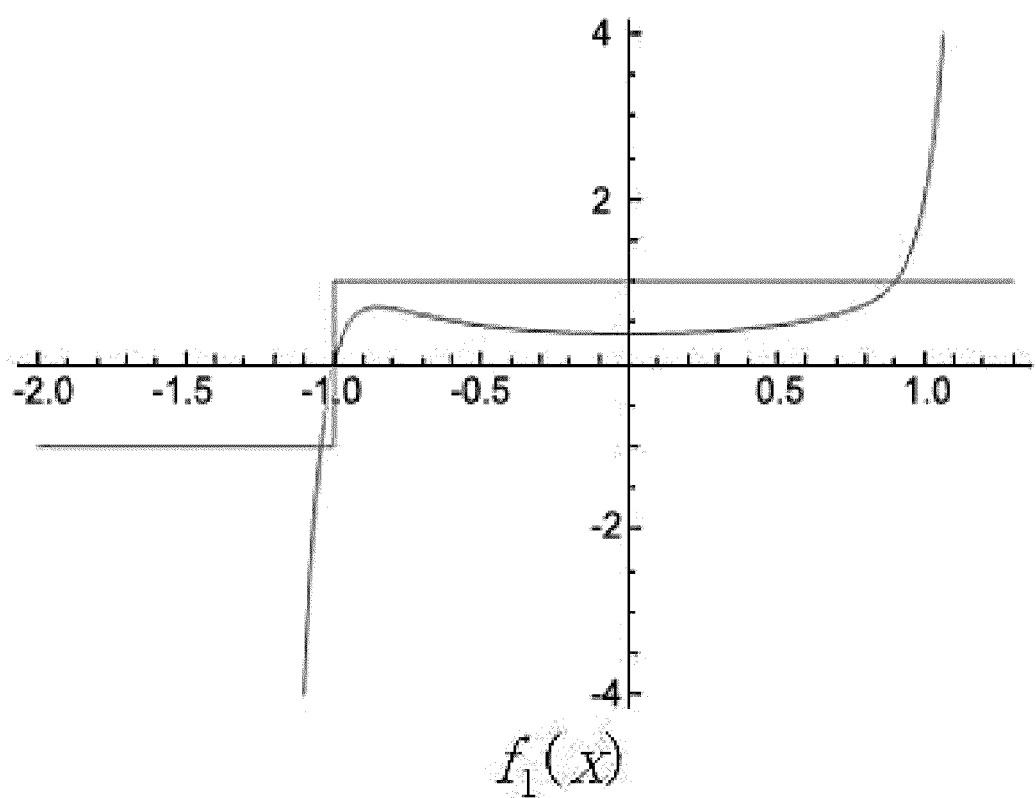
FIGS. 3 and 4 are graphs showing equations of obtaining solutions using the conventional solution-finding method and the solution-finding method of the present invention, respectively.
Figure 4:
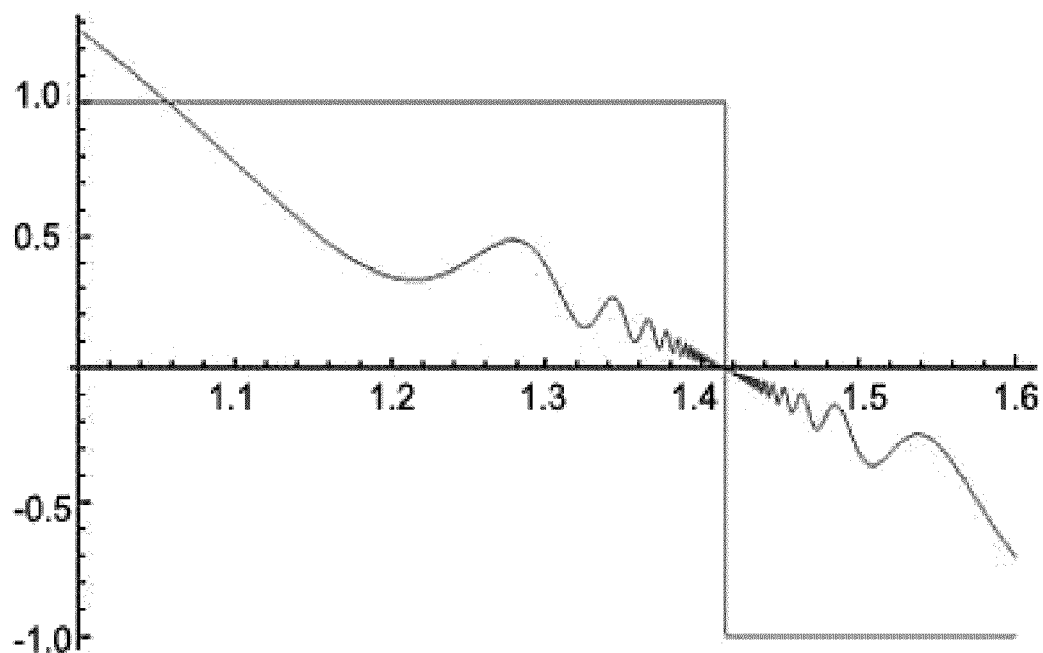

FIGS. 3 and 4 are graphs showing equations for finding a solution using a conventional solution-finding method and the solution-finding method of the present invention, respectively.

A function shown in FIG. 3 is given by the following Equation (6) and has one solution of −1 in an interval [−2, 1.3].

$$f_1(x)=(x^{15}+1)\exp(x^2-1)=0,\ -2\le x\le 1.3 \qquad (6)$$

A graph indicated in blue denotes a function $f_1(x)$, and a graph indicated in red denotes the graph of the sign conversion function of the function $f_1(x)$.

A function shown in FIG. 4 is given by the following Equation (7) and has one solution of $\sqrt{2}$ in an interval [1, 1.6].

$$f_2(x)=(x-\sqrt{2})\sin(1/(x-\sqrt{2}))-x^2+2=0,\ 1\le x\le 1.6 \qquad (7)$$

Similarly to the function $f_1(x)$, a graph indicated in blue denotes a function $f_2(x)$ and a graph indicated in red denotes the sign conversion function of the function $f_2(x)$.

Approximate solutions falling within the allowable error range were obtained by applying Newton's method and the secant method, which are conventional iterative methods, and the solution-finding method of the present invention, to the two functions, and the results thereof are shown in the following Table 1.

Table 1 shows the total number of iterations required to satisfy an allowable error below $10^{-16}$ or stop condition (that is, a condition in which iteration stops when the value of the function of an approximate solution is less than $10^{-40}$ even if the allowable error is not satisfied). Further, the upper limit of the interval was selected as the initially estimated value in Newton's method.

TABLE 1

| Example | Conventional iterative method | | New iterative method (N = 40) | |
| --- | --- | --- | --- | --- |
| | Newton's method | secant method | First embodiment | Second and third embodiments |
| $f_1(x) = 0$ | 164 | Cannot be obtained | 10 | 6 |
| $f_2(x) = 0$ | Cannot be obtained | 22 | 10 | 9 |

As shown in Table 1, in the case of the function $f_1(x)$, it can be seen that an approximate solution cannot be obtained using the secant method, and 164 iterations must be performed even using Newton's method, whereas in the first embodiment of the present invention, an approximate solution can be found by performing a maximum of 10 iterations.

Further, in the case of the function $f_2(x)$, it can be seen that an approximate solution cannot be obtained using Newton's method and as many as 22 iterations must be performed using the secant method, whereas in the first embodiment of the present invention, an approximate solution can be found by performing only 10 iterations, less than even half of the 22 iterations of the secant method.

Furthermore, referring to the results of the second and third embodiments of the present invention, it can be seen that an approximate solution can be more promptly and accurately found by combining the method of the present invention with Newton's method or the secant method which is the conventional method.

The two examples described above correspond to typical cases to which the secant method or Newton's method cannot be applied, or typical cases in which the application of the secant method or Newton's method is inefficient. In practice, referring to FIGS. 3 and 4, the conventional secant or Newton's method may cause problems in the convergence of iterative solutions due to the unsuitableness of the behavior of a function (a slope of 0 or serious vibration near a solution). In contrast, since the iteration method presented in the present invention uses only the value of a stepped sign conversion function, that is, the value of the sign of the original function, iterative solutions which always converge regardless of the behavior of the function can be obtained.

As described above, the present invention is advantageous in that a solution can be found without using an initially estimated value.

Further, the present invention is advantageous in that, since a solution is found using only a sign function without using a derivative, the speed of convergence is high.

Furthermore, the present invention is advantageous in that since the speed of convergence is high and a calculation process is simplified, numerical analysis can be accurately performed even using a low-performance device.

Furthermore, the present invention is advantageous in that approximate solutions which always converge regardless of the behavior of a target function can be obtained.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of finding a solution of an equation, the method performed by a non-transitory recording medium for obtaining an approximate solution of an equation having a solution in a predetermined interval, the method comprising:
   a) calculating, by a processor in the non-transitory recording medium, initial values based on upper and lower limits of the interval;
   b) applying the initial values to a solution-finding equation which includes a sign function and the upper and lower limits, and arranging the solution-finding equation so that a definite integral formula for the sign function of the equation is included in the solution-finding equation;
   c) calculating the definite integral formula in the arranged solution-finding equation using numerical integration, and inductively applying results of the calculation of the definite integral formula to the arranged solution-finding equation, thus obtaining an approximate solution; and
   d) iterating c) until the approximate solution obtained at c) satisfies an allowable error,
   wherein
   in a), when the initial values are $p^{(0)}=(a+b)/2$ and $\delta^{(0)}=(b-a)/2$ when the upper and lower limits of the interval are a and b, respectively.

2. The method of claim 1, wherein in b), the solution-finding equation including the sign function and the upper and lower limits is given by the following equation:

$$p^* = p^{(0)} + \frac{\operatorname{sgn} f(a)}{2} J_{\delta^{(0)}}$$

$$\text{where } J_{\delta^{(0)}} = \int_{p^{(0)}-\delta^{(0)}}^{p^{(0)}+\delta^{(0)}} \operatorname{sgn} f(x) dx.$$

3. The method of claim 1, wherein in c), the numerical integration is numerical integration using a trapezoidal rule.

4. A non-transitory recording medium storing a program for implementing the method of claim 1.

5. A non-transitory recording medium storing a program for implementing the method of claim 2.

6. A non-transitory recording medium storing a program for implementing the method of claim 3.

7. A method of finding a solution of an equation, the method performed by a non-transitory recording medium for obtaining an approximate solution of an equation having a solution in a predetermined interval, the method comprising:
   a) calculating, by a processor in the non-transitory recording medium, initial values based on upper and lower limits of the interval;
   b) applying the initial values to a solution-finding equation which includes a sign function and the upper and lower limits, and arranging the solution-finding equation so that a definite integral formula for the sign function of the equation is included in the solution-finding equation;
   c) calculating the definite integral formula in the arranged solution-finding equation using numerical integration, and inductively applying results of the calculation of the definite integral formula to the arranged solution-finding equation, thus obtaining an approximate solution; and
   d) obtaining a resulting approximate solution based on a secant method which uses the approximate solution, calculated by iterating c) a preset number of times, as an initially estimated value,
   wherein, in a), when the initial values are $p^{(0)}=(a+b)/2$ and $\delta^{(0)}=(b-a)/2$ when the upper and lower limits of the interval are a and b, respectively.

8. The method of claim 7, wherein in b), the solution-finding equation including the sign function and the upper and lower limits is given by the following equation:

$$p^* = p^{(0)} + \frac{\operatorname{sgn} f(a)}{2} J_{\delta^{(0)}}$$

$$\text{where } J_{\delta^{(0)}} = \int_{p^{(0)}-\delta^{(0)}}^{p^{(0)}+\delta^{(0)}} \operatorname{sgn} f(x) dx.$$

9. The method of claim 7, wherein in c), the numerical integration is numerical integration using a trapezoidal rule.

10. A non-transitory recording medium storing a program for implementing the method of claim 7.

11. A method of finding a solution of an equation, the method being performed by a non-transitory recording medium for obtaining an approximate solution of an equation having a solution in a predetermined interval, the method comprising:
   a) calculating, by a processor in the non-transitory recording medium, initial values based on upper and lower limits of the interval;
   b) applying the initial values to a solution-finding equation which includes a sign function and the upper and lower limits, and arranging the solution-finding equation so that a definite integral formula for the sign function of the equation is included in the solution-finding equation;
   c) calculating the definite integral formula in the arranged solution-finding equation using numerical integration, and inductively applying results of the calculation of the definite integral formula to the arranged solution-finding equation, thus obtaining an approximate solution; and
   d) obtaining a resulting approximate solution based on Newton's method which uses the approximate solution, calculated by iterating c) a preset number of times, as an initially estimated value,
   wherein in a), when the initial values are $p^{(0)}=(a+b)/2$ and $\delta^{(0)}=(b-a)/2$ when the upper and lower limits of the interval are a and b, respectively.

12. The method of claim 11, wherein in b), the solution-finding equation including the sign function and the upper and lower limits is given by the following equation:

$$p^* = p^{(0)} + \frac{\operatorname{sgn} f(a)}{2} J_{\delta^{(0)}}$$

where $J_{\delta^{(0)}} = \int_{p^{(0)}-\delta^{(0)}}^{p^{(0)}+\delta^{(0)}} \operatorname{sgn} f(x) dx.$     5

13. The method of claim 11, wherein in c), the numerical integration is numerical integration using a trapezoidal rule.

14. A non-transitory recording medium storing a program for implementing the method of claim 11.

\* \* \* \* \*